United States Patent [19]
Laue et al.

[11] Patent Number: 5,392,750
[45] Date of Patent: Feb. 28, 1995

[54] ARRANGEMENT FOR SUPPLYING FUEL FROM SUPPLY TANK TO INTERNAL COMBUSTION ENGINE OF MOTOR VEHICLE

[75] Inventors: Klaus-Bernhard Laue, Asberg; Karl Mielich, Baldham; Kurt Frank, Schorndorf-Haubersbronn; Werner Schmid, Tamm; Wolfgang Soyer, Wiernsheim; Hans-Joachim Kuppel, München; Hellmut Kegel, Gerlingen, all of Germany; Bernhard Lucas, Alcala de Hanares; Ulrich Projahn, El Soto, both of Spain

[73] Assignee: Robert Bosch GmbH, Stuttgart, Germany

[21] Appl. No.: 159,441

[22] Filed: Nov. 30, 1993

[30] Foreign Application Priority Data

Dec. 15, 1992 [DE] Germany .............................. 4242242

[51] Int. Cl.⁶ ..................... F02M 37/14; F02M 37/10; F02M 37/22; B60K 15/01
[52] U.S. Cl. ..................................... 123/509; 417/363
[58] Field of Search ............... 123/509, 510, 511, 497; 137/565; 417/360, 363, 423.3, 423.9

[56] References Cited

U.S. PATENT DOCUMENTS

| | | | |
|---|---|---|---|
| 4,776,315 | 10/1988 | Greiner | 123/509 |
| 4,780,063 | 10/1988 | Tuckey | 137/565 |
| 4,865,522 | 9/1989 | Radermacher | 417/363 |
| 4,869,225 | 9/1989 | Nagata et al. | 123/509 |
| 4,971,530 | 11/1990 | Nusser | 417/360 |
| 5,046,471 | 9/1991 | Schmid | 123/509 |
| 5,058,557 | 10/1991 | Frank et al. | 123/509 |
| 5,096,391 | 3/1992 | Tuckey | 417/423.3 |
| 5,110,265 | 5/1992 | Kato et al. | 417/363 |
| 5,195,494 | 3/1993 | Tuckey | 123/510 |

*Primary Examiner*—E. Rollins Cross
*Assistant Examiner*—Thomas N. Moulis
*Attorney, Agent, or Firm*—Michael J. Striker

[57] ABSTRACT

An arrangement for supplying fuel to an internal combustion engine of a motor vehicle has a supply tank, an aggregate which is located in the supply tank and a fuel delivery unit for supplying fuel from the supply tank to the internal combustion engine. The aggregate has a plurality of components extending along a delivery path of the fuel, is located in the supply tank, and is provided with a supporting element which carries a holding member for the components of the aggregate.

31 Claims, 6 Drawing Sheets

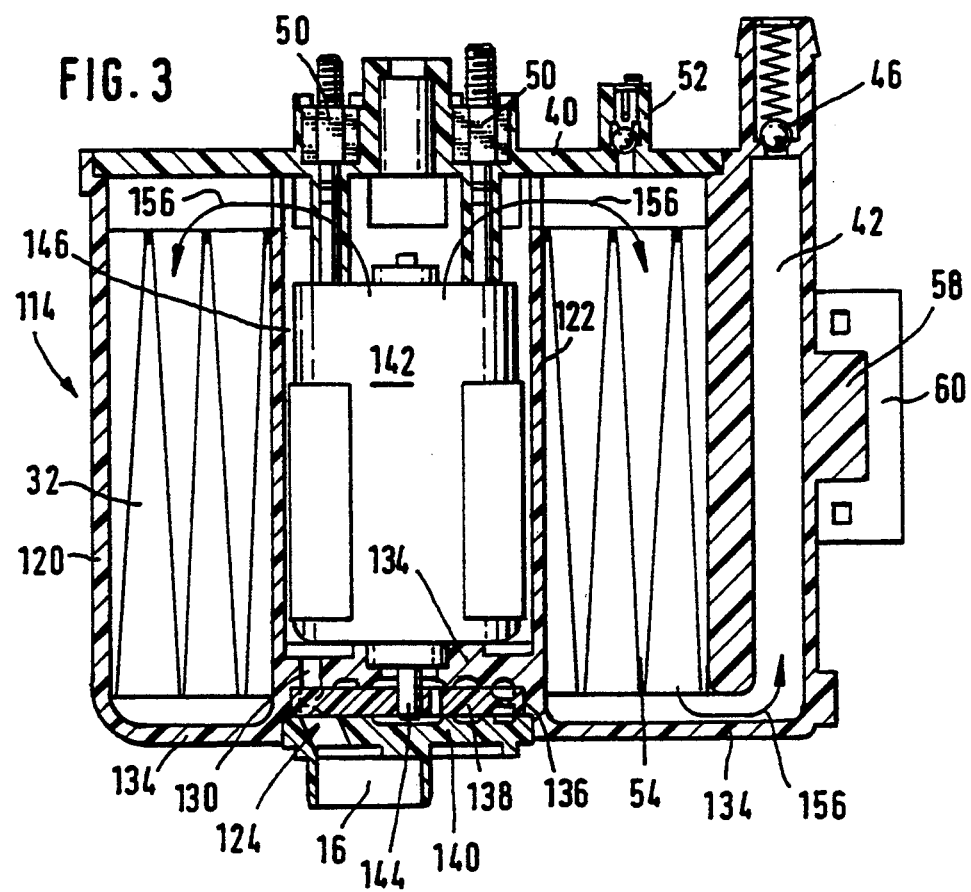
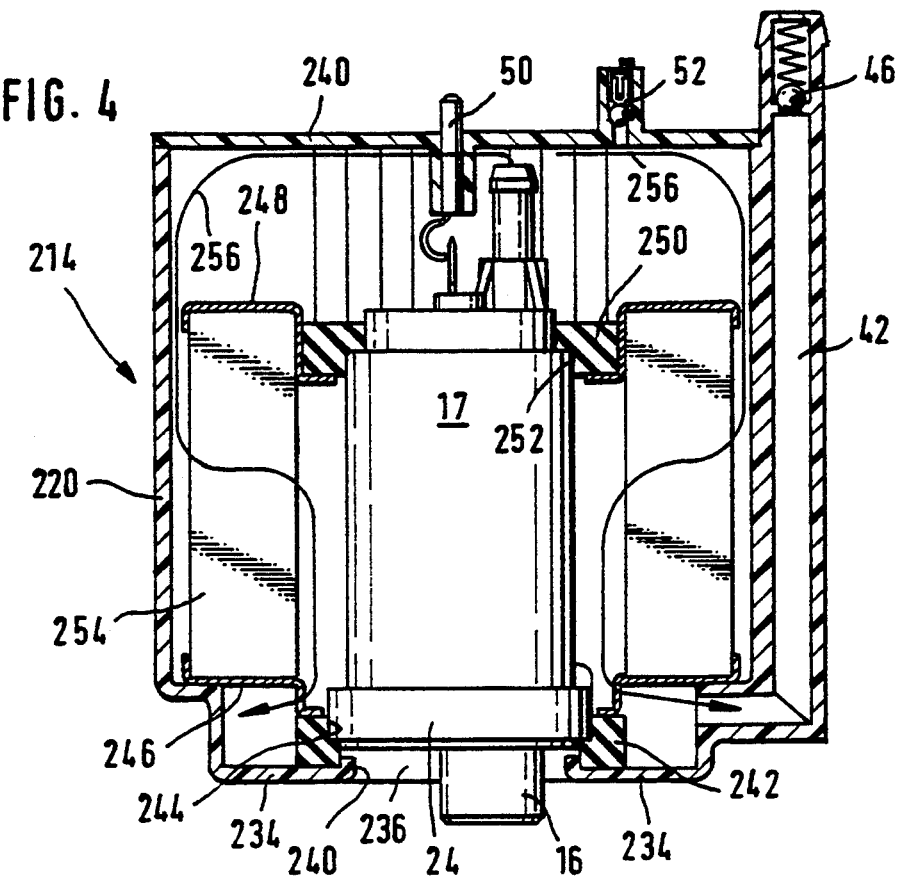

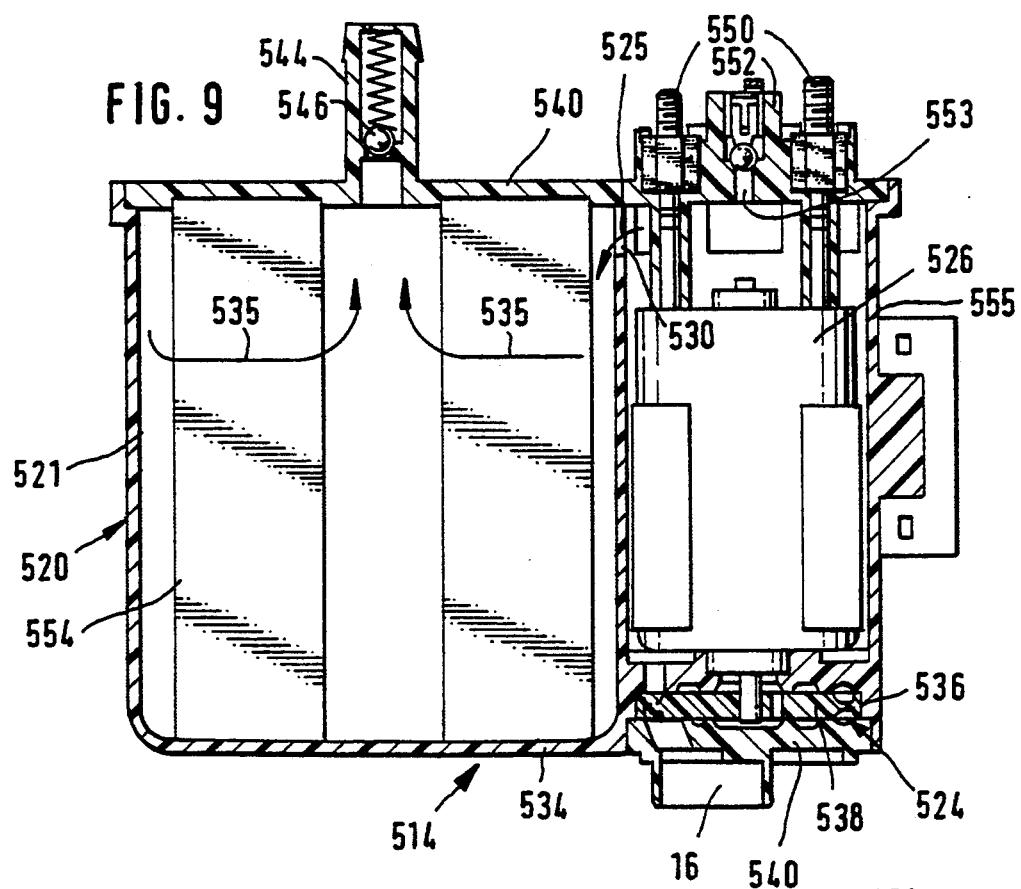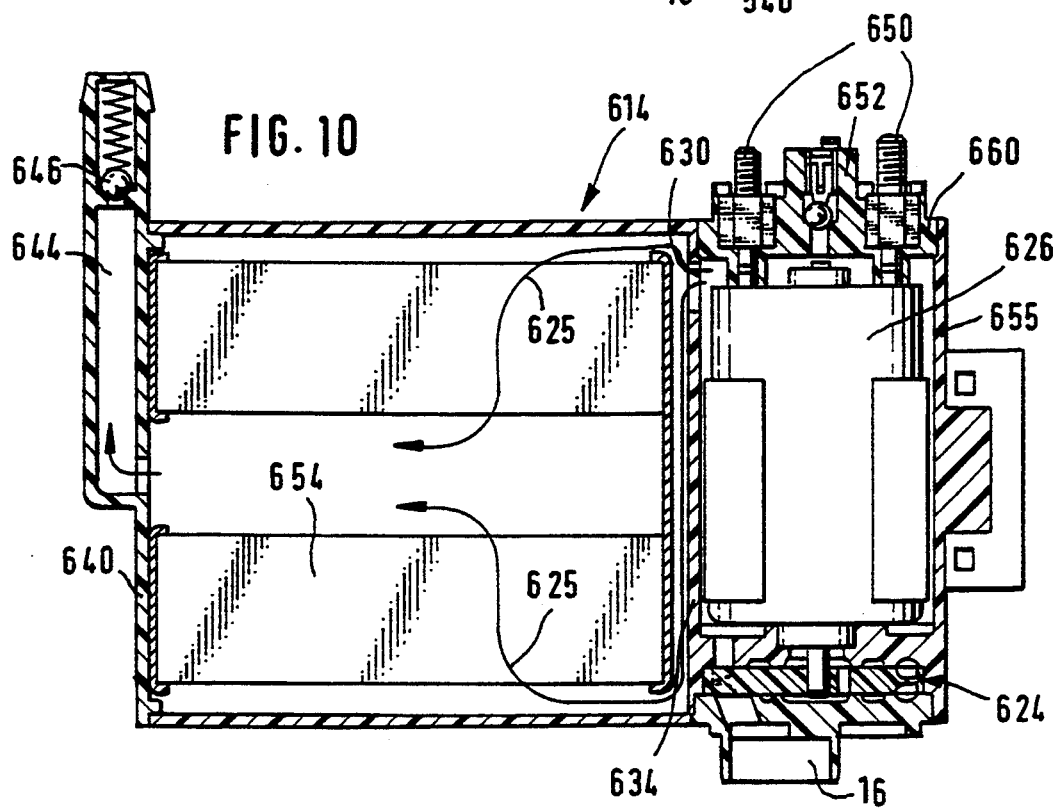

5,392,750

ARRANGEMENT FOR SUPPLYING FUEL FROM SUPPLY TANK TO INTERNAL COMBUSTION ENGINE OF MOTOR VEHICLE

BACKGROUND OF THE INVENTION

The present invention relates to an arrangement for supplying fuel from a supply tank to an internal combustion engine of a motor vehicle.

Arrangements of the above-mentioned general type are known in the art. In a known arrangement a plurality of components are located along the fuel delivery path and influence or treat the fuel, such as for example a delivery pressure regulator, a pressure wave damper, a fuel filter, a fuel delivery aggregate, etc. Each of these components is mounted individually. As a result, such an arrangement is quite expensive in the limited structural space available in the motor vehicle. When a fault is determined after the final testing of the arrangement, its elimination is relatively difficult.

SUMMARY OF THE INVENTION

Accordingly, it is an object of the present invention to provide an arrangement for supplying fuel from a supply tank to an internal combustion engine of a motor vehicle, which avoids the disadvantages of the prior art.

In keeping with these objects and with others which will become apparent hereinafter, one feature of the present invention resides, briefly stated, in an arrangement for supplying fuel from a supply tank to an internal combustion engine of a motor vehicle, in which an aggregate which contains a fuel delivery unit is arranged in a supply tank and provided with a support element which has holding means for aggregate components.

When the arrangement is designed in accordance with the present invention, the whole aggregate, before its insertion, is mounted in a simple manner, and can be tested. The insertion of the finished aggregate in the tank requires no more expenses than the mounting of the fuel delivery unit alone in the known supply arrangements.

In accordance with another feature of the present invention, the supporting element can be formed as parts composed of synthetic plastic material and held on the aggregate components.

In accordance with still another feature of the present invention, the holding means can be formed as niche-like recesses, as conduit connections and as tubular parts.

The supporting element can be provided with a cup-shaped recess for receiving the fuel filter, a bucket-shaped recess for receiving a fuel delivery unit, a bucket-shaped opening for receiving components for the fuel delivery unit, etc.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a view showing a second embodiment of the aggregate of FIG. 2;

FIG. 4 is a view showing a third embodiment of the aggregate of FIG. 2;

FIG. 9 is a view showing a sixth embodiment of the aggregate of FIG. 2;

FIG. 10 is a view showing a seventh embodiment of the aggregate of FIG. 2; and

DESCRIPTION OF PREFERRED EMBODIMENTS

Figure 1:
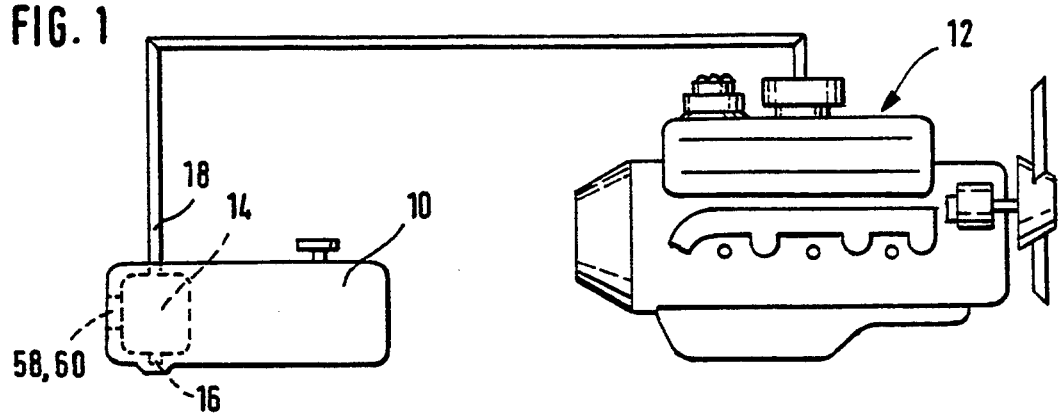
FIG. 1 is a view schematically showing an arrangement for supplying fuel from a supply tank to an internal combustion engine of a motor vehicle.

As shown in FIG. 1, a supply tank 10 contains fuel which must be supplied to an internal combustion engine 12. For this purpose an aggregate 14 provided with a fuel delivery unit 17 is located in the fuel supply tank 10. The fuel delivery unit 17 sucks the fuel through a suction pipe 16 by a not-shown pump and delivers it through a pressure conduit 18 to the internal combustion engine 12.

Figure 2:
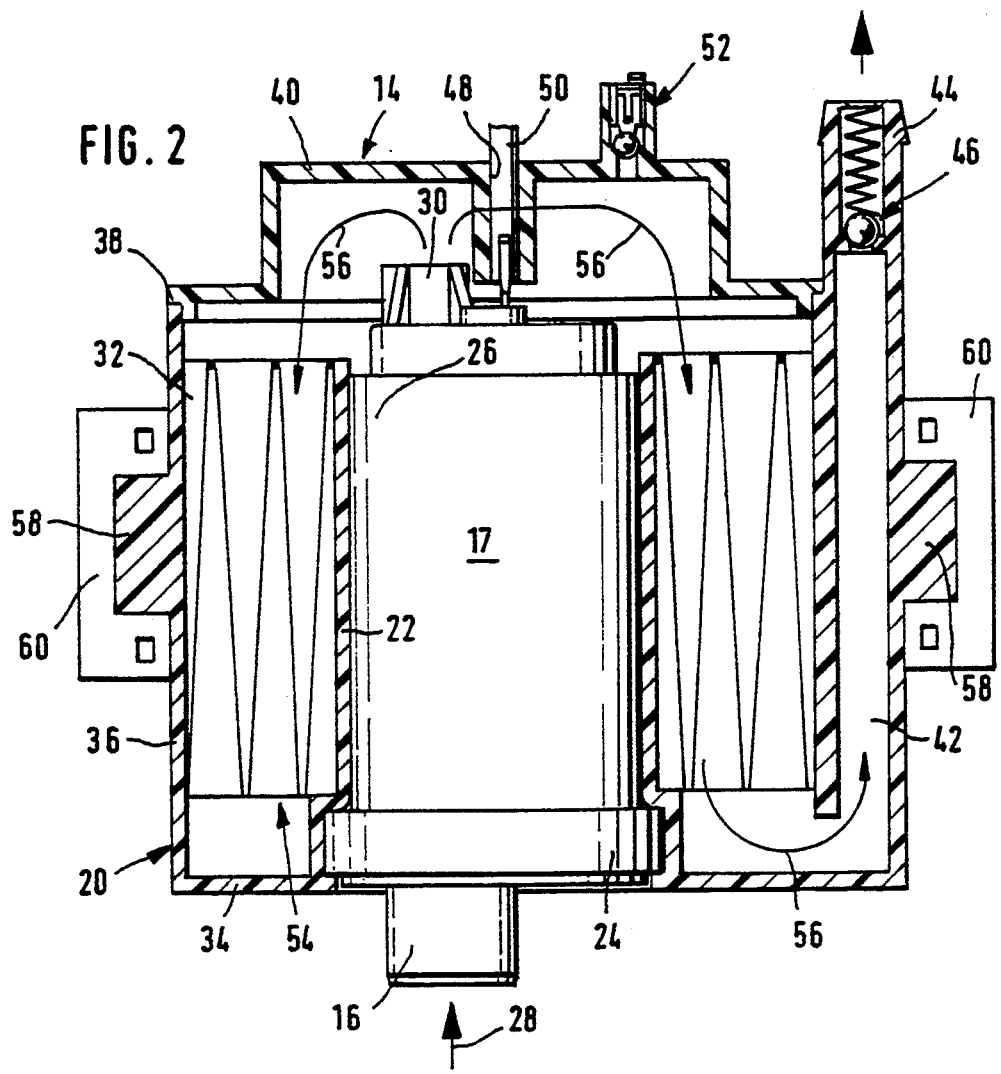
FIG. 2 is a view showing a first embodiment of an aggregate of the fuel supplying arrangement in accordance with the present invention.

As shown in FIG. 2, the aggregate 14 has a supporting element 20 which is composed of a synthetic plastic material and carries holding means for individual aggregate components. The supporting element 20 has a central tubular portion 22 which serves as a holder for a fuel delivery unit 17 as shown in FIG. 2. The fuel delivery unit 17 has a pump part 24 and a motor part 26. The not-shown motor operates as a drive motor for a not-shown delivery pump. When the drive motor 26 is activated and the pump 24 rotates, it aspirates fuel in the direction of the arrow 28 and pumps it through the joint housing of the fuel delivery unit 17 until the fuel exits a pressure output 30.

The tubular portion 22 is surrounded by a ring-shaped cup 32 which has a cup bottom 34 connected with the tubular portion 22. The wall of the tubular portion 22 simultaneously forms the inner wall of the ring-shaped cup 32. The outer wall 36 of the ring-shaped cup 32, which is connected in one piece with the cup bottom 34, is located outwardly beyond the tubular portion 22 so that its end surface 38 which faces away from the cup bottom 34 forms an abutment for an aggregate cover 40. The aggregate cover 40 closes the ring-shaped cup 32.

Since the fuel delivery unit 17 arranged in the tubular portion 22 does not tightly close the tubular portion 22, the ring-shaped cup 32 has a raiser conduit 42 which communicates near the cup bottom 34 with the ring-shaped cup 32 in a fluid conductive manner. The raiser conduit 42 is provided at its free end with a pressure pipe 44 which accommodates a check valve 46. The pressure conduit 18 shown in FIG. 1 is connected with the pressure pipe 44. The aggregate cover 40 further has a passage 48 for an electrical supply cable 50 and an overpressure valve 52. A ring-shaped filter 54 is located in the ring chamber of the ring-shaped cup 32. When the fuel to be delivered leaves the pressure outlet 30 of the fuel delivery unit 16, it is first located in the region of the aggregate cover 40 and flows then through the filter 54 in the direction of the arrow 56, until it is collected in the region of the cup bottom 34 and from there flows into the raiser conduit 42 and then into the pressure conduit 18. The aggregate 14 is connected with a wall of the supply tank 10 by corresponding holding elements 58 and vibration dampers 60 mounted on them. The overpressure valve 52 protects the cup-shaped supporting element from damage which can occur due to undesirably high pressure built up inside the cup-shaped synthetic plastic supporting element 20.

In the subsequent embodiments, the elements of the aggregate 14 which correspond to the elements shown in FIG. 2 are identified with the same reference numerals.

In the embodiment of FIG. 3, the aggregate 114 also has a supporting element 120 composed of a synthetic plastic material. With the supporting element 120, the cup bottom 134 however closes also one side of the tubular portion 122. In the region of the tubular portion 122 the cup bottom 134 is reinforced, so that a chamber 136 for an impeller 138 of the delivery pump 124 can be arranged in it. A chamber cover 140 with the suction pipe 16 closes the chamber 136 at the suction side. A pre-mounted, electrical drive motor 142 is accommodated in the thusly formed niche-shaped tubular portion 122 and has an armature shaft 144 fixedly connected with the impeller 138 of the delivery pump 124 for joint rotation with it. In this embodiment the arrangement is also provided with an aggregate cover 40 which closes the ring-shaped cup 32 and the tubular portion 122. The supply cable 50 for the electric drive motor 142 also extends through the cover 40. Also, it has an overpressure valve 52. Finally a fuel filter 54 is accommodated in the ring-shaped inner chamber of the cup 32, and a suction conduit 42 with a check valve 46 is connected near the cup bottom 134 with the ring chamber of the ring-shaped cup 32. The supporting element 120 is also provided with the holding element 58 and vibration dampers 60 for mounting of the supporting element in the tank 10. During the operation of the aggregate 144, the delivery pump 134 sucks fuel through the suction pipe 16 and pumps the same through a pressure outlet 130 in the cup bottom 134 into the niche-shaped chamber 146 inside the wall of the tubular portion 122. It rinses through or around the motor 142 which is cooled with the fuel, and then the fuel flows in the direction of the arrow 156 through the filter 54, then through the raiser conduit 42 and the check valve 46 into the pressure conduit 18 of the supply arrangement.

In the aggregate 214 shown in FIG. 4, a fuel supply unit 17 corresponding to the fuel supply unit of FIG. 2 is located inside the supporting element 220 composed of synthetic plastic material. However, in this embodiment no tubular portion is provided for holding the fuel delivery unit 16. Instead, the cup bottom 234 has a central passage 236, from which the suction pipe 16 extends into the tank. The cup bottom 234 has a ring collar 240 provided in the edge region of the passage 236 and extending inwardly into the cup-shaped supporting element 20 for centering a first elastic damping ring 242. The damping ring 242 has a ring recess 244 for accommodating the pump part 24 of the fuel delivery unit 17 and thereby centers the fuel delivery unit. Further, a supporting part 246 is fixedly connected with the damping ring 242 and supports a filter 254 surrounding the fuel delivery unit 17. A second, rigid supporting ring 248 is connected with the filter at the end of the filter 254 which faces away from the damping ring 242. A second damping ring 250 is supported on the second supporting ring 248. A centering passage 252 for the fuel delivery unit 17 is provided in the second damping ring 250. In the above-described construction the fuel delivery unit 17 is centered relative to the supporting element 214, and the filter 254 is held relative to the fuel delivery unit 17 in an orderly fashion. The damping elements 242 and 250 are provided in order to obtain a noiseless running of the fuel delivery unit 17. In this case the substantially cup-shaped supporting element 220 is provided with a cover 240 which has a passage for the electrical connection 50 of the electric motor of the fuel delivery unit 17. An overpressure valve 52 is provided as well. As in the previous embodiments, the supporting element 220 has a suction conduit 42 with a check valve 46. the suction conduit 42 is connected with the inner chamber of the cup-shaped supporting element 220 near the cup bottom 234. When the fuel delivery unit 17 operates and fuel is sucked through the suction pipe 16, the fuel flows through the delivery unit 17 and exits above the filter 254. The fuel then follows the arrows 256, passes through the filter 254 and leaves the aggregate 214 through the suction conduit 42 and the check valve 46, from which it is supplied into the pressure conduit 18.

Figure 5:
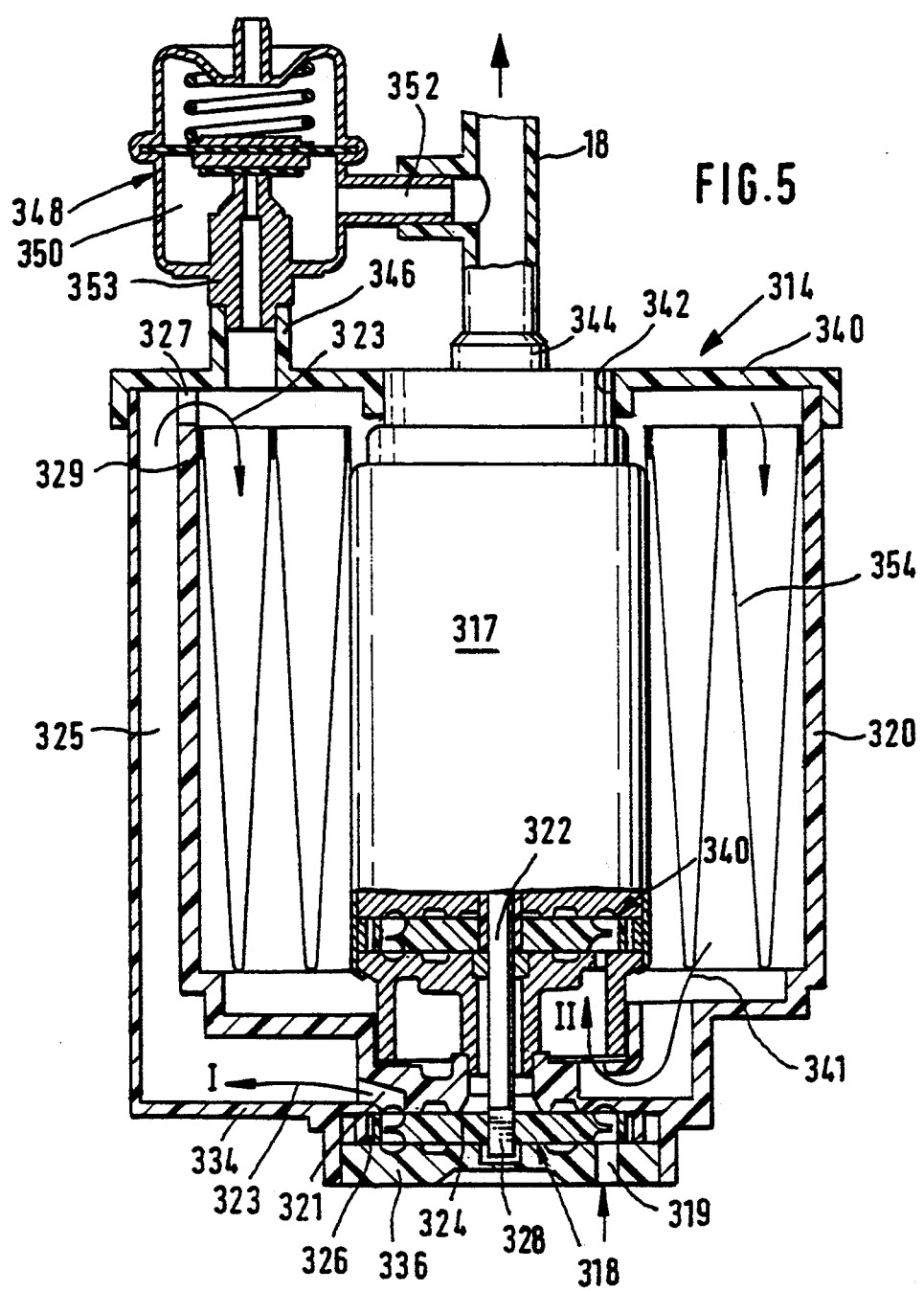
FIG. 5 is a view showing a fourth embodiment of the aggregate of FIG. 2.

In the embodiment of FIG. 5 the fuel delivery unit 17 is provided with a two-stage pump. A first delivery member 324 is mounted on a free end 328 of an armature shaft 322 of the electric drive motor for joint rotation with it. The delivery member rotates in a pump chamber 326 which is formed by a recess in the cup bottom 334 of the cup-shaped supporting element 320. The chamber is also closed by a suction cover 336. A second pump stage 340 is integrated in the housing of the fuel delivery unit 317, similarly to the embodiment shown in FIGS. 2–4. The first pump stage 318 with the delivery member 324 sucks fuel through a suction opening 319 in the suction cover 336 and pumps it through a pressure outlet 321 in the direction of the arrow 323 into a raiser conduit 325, and then from the latter through a passage 327 in the wall 329 of the cup-shaped supporting element 320 into the inner chamber of the supporting element. A ring-shaped or a tubular filter 354 is arranged there, as in the preceding embodiments, and completely surrounds the fuel delivery unit 317. Fuel coming from the raiser conduit 325 flows through the filter 354 in accordance with the arrow 323 and then flows into the second pump stage 340 as shown by the arrow 341. There it flows through the delivery unit 317 and then through a pressure pipe 344 into the pressure conduit 18. The aggregate cover 340 in this case is provided with a central recess 342 and formed so that it guarantees an accurate centering of the delivery unit 317. A tubular portion 346 is provided on the cover 340 for holding a pressure regulator 348. The pressure chamber 350 of the pressure regulator 348 is connected through corresponding tubular connections 352 and 353 with the pressure conduit 18 or with the inner chamber of the cup-shaped supporting element 320.

In this embodiment the second pump or pressure stage 340 always provides a sufficient fuel quantity which is supplied from the first pump or pre-stage 318 and stored in the cup-shaped element 320.

Figure 6:
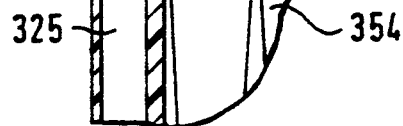
FIG. 6 is a view showing a variation of the aggregate of FIG. 5.

The embodiment shown in FIG. 6 substantially corresponds to the embodiment shown in FIG. 5. However, in the embodiment of FIG. 6 the tubular portion 36 is connected with a not-shown return conduit, instead of the pressure regulator 348, for supplying not needed fuel from the internal combustion engine 12 back to the aggregate 314.

Figure 7:
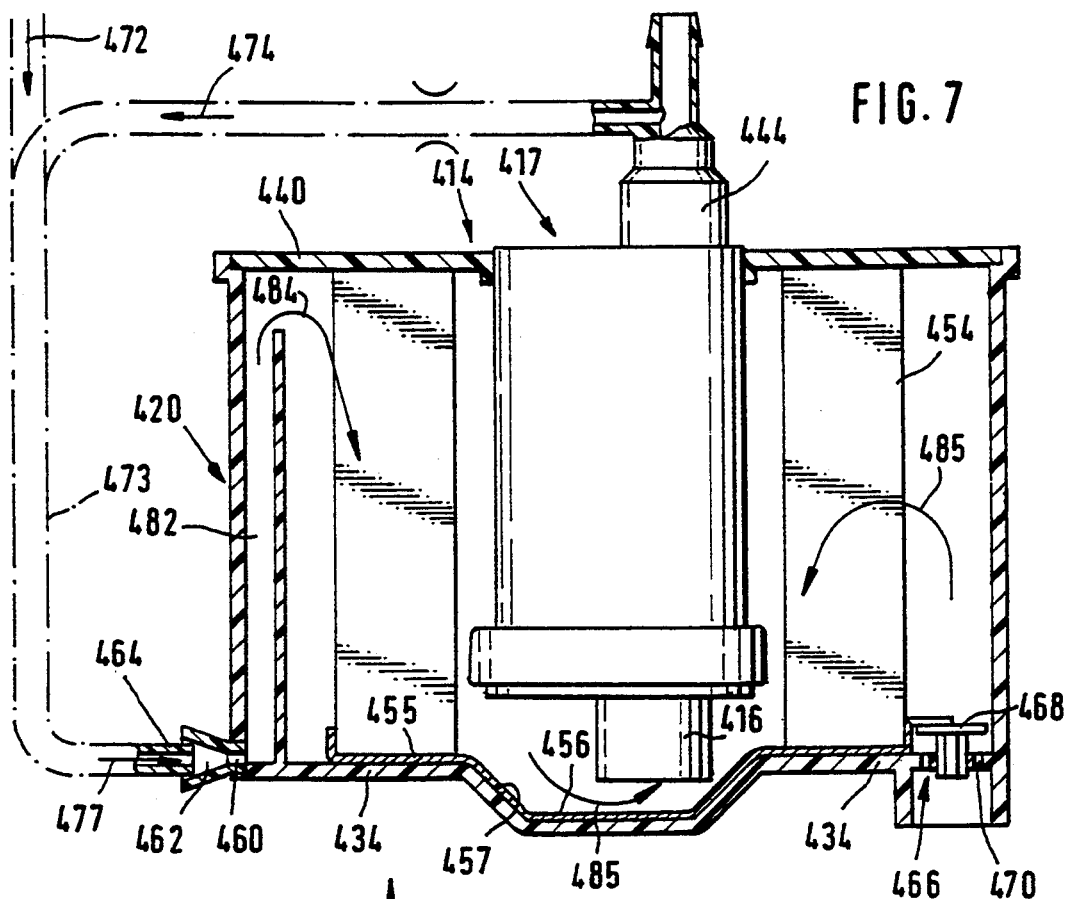
FIG. 7 is a view showing a fifth embodiment of the aggregate of FIG. 2.

In the embodiment of FIG. 7, the supporting element 420 for the aggregate 414 is cup-shaped. The aggregate cover 440 has a central recess, so that the delivery unit 417 engages through it and is thereby centered. In this case also the delivery unit 417 is surrounded by a ring-shaped or tubular filter 454. The filter is supported on a plate-shaped support 455 which engages with a projection 456 into a depression 457 of the cup bottom 434 and is centered in the latter. Near the cup bottom 434, the cup wall of the cup-shaped supporting element 420 is provided with an inflow opening 460 of a nozzle 462 cooperating with supply conduit 464 as a jet pump. The jet pump 460,462,464 serves for filling the cup-shaped supporting element 420, since the suction pipe 416 of the delivery unit 417 opens inside of the substantially closed supporting element 420. The delivery unit 417 provides for suction of fuel which is located still in the cup-shaped delivery unit. In order to ensure a first filling of the supporting element cup 420, a first filling valve 466 is arranged in the cup bottom 434 and formed as a check valve. The valve 466 opens when fuel fills the supply tank 10 but the supporting element 420 is filled still with air. Then a pressure is built on the plate-shaped closure member 468 of the valve 436 through the inflow opening 470 in the cup bottom 434, and brings the first filling valve to its opening position shown in FIG. 7. The supporting element 420 fills through the inflow openings 470 in correspondence with the filling of the tank 10. The delivery unit 417 can then aspirate fuel and supply it through the pressure pipe 444 to the internal combustion engine 12. The jet pump 460,462,464 serves for further filling of the cup-shaped supporting element 20. This jet pump is driven either by excessive fuel which flows back from the internal combustion engine in a conduit 473 in accordance with the arrow 472, or by a branching stream in accordance with the arrow 474 which branches from the pressure side of the fuel delivery unit 417 or the pressure conduit 18. It is important that the jet pump 460,462,464 is located under the fuel level in the supply tank 10, so that the fuel stream supplied to the nozzle 462 in accordance with the arrow 477 entrains further fuel from the supply tank 10 and provides an orderly filling of the cup-shaped supporting element 420.

Figure 8:
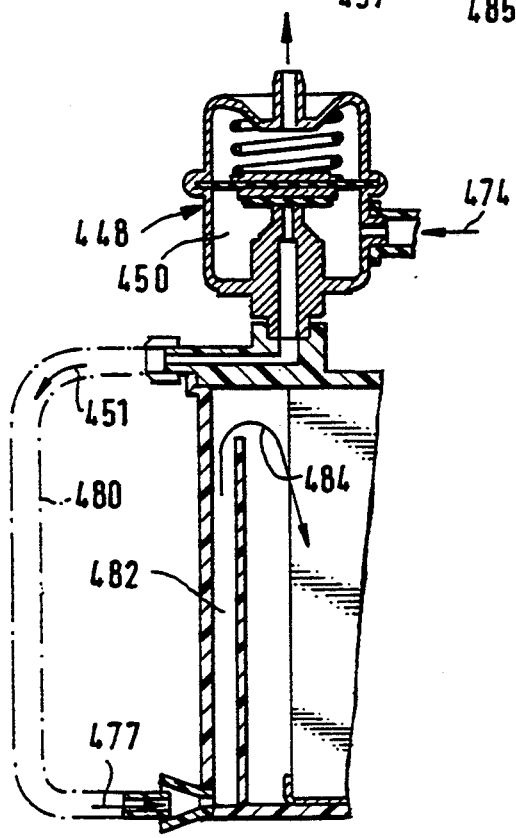
FIG. 8 is a view showing a variation of the aggregate of FIG. 7.

The embodiment of FIG. 8 substantially corresponds to the above-described embodiment. Moreover, in this embodiment a pressure regulator 44 is provided and arranged similarly to the pressure regulator 348 in FIG. 5. However, in the embodiment of FIG. 8 the fuel which flows from the pressure chamber 450 of the pressure regulator 448 in accordance with the arrow 451 is supplied through a branching conduit 480 of the jet pump 460,462,464, from which it is supplied through a raiser conduit 482 into the chamber of the cup-shaped supporting element 420 (see arrows 484 in FIGS. 7 and 8). From there the fuel delivery unit 417 sucks the fuel in accordance with the arrow 485 and supplies it to the internal combustion engine 12.

Figure 11:
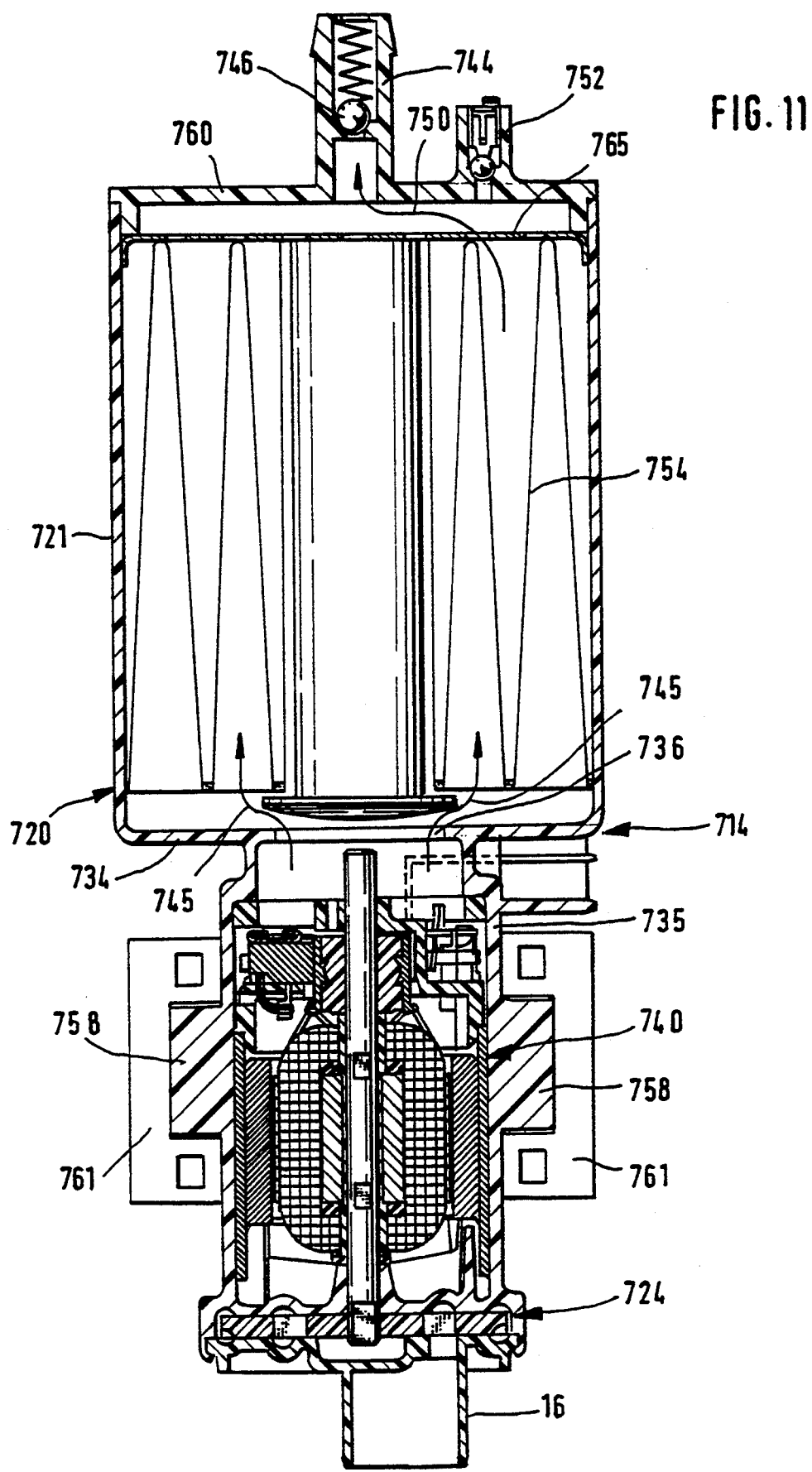
FIG. 11 is a view showing an eighth embodiment of the aggregate of FIG. 2.

In contrast to the above-discussed embodiments in which the fuel delivery unit is always located inside the cup-shaped supporting element, the fuel delivery unit in the aggregate shown in FIGS. 9, 10 and 11 is located in the holding means which is arranged outside the supporting element cup and fixedly connected with it.

The arrangement shown in FIG. 9 has a supporting element 520 with a cup-shaped receptacle 521 accommodating a filter 554. A holder 555 for an electric drive motor 526 is arranged on the cup wall of the supporting element 520 and is niche-shaped or cup-shaped. Both the cup inner chamber and the niche inner chamber are closed by a joint aggregate cover 540. The electrical connections 550 for the electric motor 526 and also a check valve 546 and an overpressure valve 552 are provided in the aggregate cover 540. The overpressure valve is connected through a connecting conduit 553 with the niche-shaped holder for the electric motor. The check valve 546 is accommodated in the pressure pipe 544 which is connected with the pressure conduit 18. The delivery pump 524 corresponding to the embodiment of FIG. 3 is accommodated in the cup bottom 534 in the region of the niche-shaped holder 555 for the electric motor 526. The cup bottom 533 is reinforced in the region of the holder 554. An impeller 538 of the delivery pump 524 is arranged in a chamber-shaped recess 536 which is closed by a suction cover 540. During the operation of the aggregate 514 the pump 524 sucks fuel through the suction pipe 16 and pumps it through the niche-shaped holder 555, and then fuel is supplied in accordance with the arrow 525 through a passage 530 on the cup-shaped receptacle for the filter 554, and thereafter the fuel after passing the filter flows from its central region in correspondence with the arrow 535 through the pressure pipe into the pressure conduit 18.

In the embodiment of FIG. 10 the arrangement is also provided with the above-mentioned niche-shaped receptacle for the electrical motor 626. In deviation from the above-described embodiment, the receptacle cup 655 for the filter 654 is arranged so that the niche-shaped holder for the electric motor 626 is located on the cup bottom 634 of the filter receptacle cup 655. The cover 640 of the filter receptacle cup is located on the side of the filter receptacle cup which faces away from the electric motor 626. It also has a pressure pipe 644 with a check valve 646. The niche-shaped holder 655 for the electric motor 626 has a separate niche cover 660 through which the electrical connections 650 of the electric motor 626 pass. Further, the overpressure valve 652 is arranged in the niche cover 660. During the operation of the aggregate 614 the pump 624 operating from the electric motor 626 sucks fuel through the suction pipe 16 and pumps it then through the passage 630 in correspondence with the arrow 625 into the edge region of the filter receptacle cup 655. After passing the filter 654, the fuel exits through the pressure pipe 644 which is arranged centrally in the cover 640 and is supplied into the pressure conduit 18.

The embodiment of FIG. 11 differs from the above-described embodiments in that the supporting element 720 of the aggregate 714 has a receptacle cup 721 for the filter 754, and a bucket shaped receptacle 735 is arranged on its cup bottom 734 so that the bucket bottom and the cup bottom 234 are formed by a joint wall 734. The receptacle bucket 735 is formed of one piece with the receptacle cup 721. A fuel throughflow opening 735 is arranged in the common bucket or cup bottom 734. The receptacle bucket 735 contains both the complete electric motor 740 and the delivery pump 724. The fuel supplied by the delivery pump flows through the suction pipe 16 into the delivery pump 724 and is supplied from it into the inner chamber of the bucket 735 and then flows through the electric motor 724. From there the fuel is supplied in correspondence with the arrow 745 into the filter receptacle cup 721, flows through the filter 754, and exits in correspondence with the arrow 750 through a pressure pipe 744 provided with the check valve 746 and connected with the pressure conduit 18. The pressure pipe 744 is formed on a cover 760 which has an overpressure valve 752 and closes the receptacle cup 721 for the filter 754. In this embodiment the filter 754 is arranged on a perforated support 765 which is centered inside the cup 721. In this embodiment the holding element 758 and the vibration damper 761 are provided on the receptacle bucket 735 for the electric motor 740.

All the above-described embodiments have the common feature that the arrangement for supplying fuel from a supply tank to the internal combustion engine of a motor vehicle has an aggregate which is provided with a supporting element carrying holding means for the aggregate components. The aggregate components can be formed by a filter, an electric drive motor and/or a delivery pump, a pressure regulator, etc.

It will be understood that each of the elements described above, or two or more together, may also find a useful application in other types of constructions differing from the types described above.

While the invention has been illustrated and described as embodied in an arrangement for supplying fuel from a supply tank to an internal combustion engine of a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An arrangement for supplying fuel to an internal combustion engine of a motor vehicle, comprising a supply tank; and an aggregate which is located in said supply tank and has a fuel delivery unit for supplying fuel from said supply tank to the internal combustion engine, said aggregate having a plurality of components extending along a delivery path of the fuel, said aggregate which is located in said supply tank being provided with a single supporting element which is provided with all holding means for holding all said components of said aggregate.

2. An arrangement as defined in claim 1, wherein said components of said aggregate include a fuel filter, and a delivery pressure regulator.

3. An arrangement as defined in claim 1, wherein said supporting element is formed as a structural part composed of a synthetic plastic material and supporting components of said aggregate.

4. An arrangement as defined in claim 1, wherein said holding means are formed as niche-shaped receptacles.

5. An arrangement as defined in claim 1, wherein said holding means are formed as conductor connectors.

6. An arrangement as defined in claim 1, wherein said holding means are formed as tubular portions.

7. An arrangement as defined in claim 1, wherein said components of said aggregate include a fuel filter, said supporting element having a cup-shaped receptacle for receiving said fuel filter.

8. An arrangement as defined in claim 1, wherein said fuel delivery unit has a plurality of structural parts, said supporting element having a bucket shaped receptacle for receiving at least one of said structural parts of said fuel delivery unit.

9. An arrangement as defined in claim 1, wherein said supporting element has a bucket shaped receptacle for receiving said fuel delivery unit.

10. An arrangement as defined in claim 8, wherein said structural parts of said fuel delivery unit include a drive motor and a delivery pump provided with a delivery member operatively connected with said drive motor, said bucket-shaped receptacle receiving said drive motor, said supporting element having a recess forming a pump chamber in which said delivery member of said delivery pump is rotatably arranged.

11. An arrangement as defined in claim 1, wherein said supporting element is formed by a cup-shaped receptacle, a bucket-shaped receptacle and an associated cover part.

12. An arrangement as defined in claim 1, wherein said supply tank has a tank wall which holds said supporting element, said aggregate having a vibration damper located between said supporting element and said tank wall.

13. An arrangement as defined in claim 12, wherein said vibration damper is connected with said supporting element.

14. An arrangement for supplying fuel to an internal combustion engine of a motor vehicle, comprising a supply tank; and an aggregate which is located in said supply tank and has a fuel delivery unit for supplying fuel from said supply tank to the internal combustion engine, said aggregate having a plurality of components extending along a delivery path of the fuel, said aggregate which is located in said supply tank being provided with a supporting element which carries holding means for said components of said aggregate, said fuel delivery unit having a plurality of structural parts, said supporting element having a bucket shaped receptacle for receiving at least one of said structural parts of said fuel delivery unit, said components of said aggregate including a ring-shaped filter, said aggregate having a cup-shaped receptacle inside which said bucket-shaped receptacle is arranged so as to form a ring-shaped recess for a ring-shaped fuel filter.

15. An arrangement as defined in claim 14, wherein said bucket shaped receptacle is arranged near said cup-shaped receptacle on said supporting element.

16. An arrangement as defined in claim 15, wherein said bucket-shaped receptacle has an overflow opening to said cup-shaped receptacle.

17. An arrangement for supplying fuel to an internal combustion engine of a motor vehicle, comprising a supply tank; and an aggregate which is located in said supply tank and has a fuel delivery unit for supplying fuel from said supply tank to the internal combustion engine, said aggregate having a plurality of components extending along a delivery path of the fuel, said aggregate which is located in said supply tank being provided with a supporting element which carries holding means for said components of said aggregate, said fuel delivery unit having a plurality of structural parts, said supporting element having a bucket shaped receptacle for receiving at least one of said structural parts of said fuel delivery unit, said supporting element having a cup-shaped receptacle, said aggregate further having a cover part which simultaneously closes said cup-shaped receptacle and said bucket-shaped receptacle.

18. An arrangement for supplying fuel to an internal combustion engine of a motor vehicle, comprising a supply tank; and an aggregate which is located in said supply tank and has a fuel delivery unit for supplying fuel from said supply tank to the internal combustion engine, said aggregate having a plurality of components extending along a delivery path of the fuel, said aggregate which is located in said supply tank being provided with a supporting element which carries holding means for said components of said aggregate, said fuel delivery unit having a plurality of structural parts, said supporting element having a bucket shaped receptacle for receiving at least one of said structural parts of said fuel delivery unit, said supporting element having a cup-shaped receptacle, and two separate covers closing said cup-shaped receptacle and said bucket-shaped receptacle correspondingly.

19. An arrangement as defined in claim 18, wherein said aggregate has a delivery conduit with a pressure-side portion, said cover part for said cup-shaped receptacle having a connection for said pressure-side portion of said delivery conduit.

20. An arrangement for supplying fuel to an internal combustion engine of a motor vehicle, comprising a supply tank; and an aggregate which is located in said supply tank and has a fuel delivery unit for supplying fuel from said supply tank to the internal combustion engine, said aggregate having a plurality of components extending along a delivery path of the fuel, said aggregate which is located in said supply tank being provided with a supporting element which carries holding means for said components of said aggregate, said fuel delivery unit having a plurality of structural parts, said supporting element having a bucket shaped receptacle for receiving at least one of said structural parts of said fuel delivery unit, said structural parts of said fuel delivery unit including a drive motor and a delivery pump provided with a delivery member operatively connected with said drive motor, said bucket-shaped receptacle receiving said drive motor, said supporting element having a recess forming a pump chamber in which said delivery member of said delivery pump is rotatably arranged, said aggregate having a cover which closes said recess of said supporting element and is provided with an inflow opening which opens into said pump chamber.

21. An arrangement for supplying fuel to an internal combustion engine of a motor vehicle, comprising a supply tank; and an aggregate which is located in said supply tank; and has a fuel delivery unit for supplying fuel from said supply tank to the internal combustion engine, said aggregate having a plurality of components extending along a delivery path of the fuel, said aggregate which is located in said supply tank being provided with a supporting element which carries holding means for said components of said aggregate, said components of said aggregate including a fuel filter, said supporting element having a cup-shaped receptacle for receiving said fuel filter, said aggregate having a delivery conduit with a pressure-side portion, said cup-shaped receptacle having a connection for said pressure-side portion of said delivery conduit.

22. An arrangement for supplying fuel to an internal combustion engine of a motor vehicle, comprising a supply tank; and an aggregate which is located in said supply tank and has a fuel delivery unit for supplying fuel from said supply tank to the internal combustion engine, said aggregate having a plurality of components extending along a delivery path of the fuel, said aggregate which is located in said supply tank being provided with a supporting element which carries holding means for said components of said aggregate, said components of said aggregate including a fuel filter, said supporting element having a cup-shaped receptacle for receiving said fuel filter, said aggregate having a return conduit, said cup-shaped receptacle having a supply opening with which said return conduit is connected.

23. An arrangement for supplying fuel to an internal combustion engine of a motor vehicle, comprising a supply tank; and an aggregate which is located in said supply tank and has a fuel delivery unit for supplying fuel from said supply tank to the internal combustion engine, said aggregate having a plurality of components extending along a delivery path of the fuel, said aggregate which is located in said supply tank being provided with a supporting element which carries holding means for said components of said aggregate, said components of said aggregate including a fuel filter, said supporting element having a cup-shaped receptacle for receiving said fuel filter, said components of said aggregate including a pressure regulator, said cup-shaped receptacle having a conduit connection which opens in said cup-shaped receptacle and is provided for said pressure regulator.

24. An arrangement for supplying fuel to an internal combustion engine of a motor vehicle, comprising a supply tank; and an aggregate which is located in said supply tank and has a fuel delivery unit for supplying fuel from said supply tank to the internal combustion engine, said aggregate having a plurality of components extending along a delivery path of the fuel, said aggregate which is located in said supply tank being provided with a supporting element which carries holding means for said components of said aggregate, said components of said aggregate including a fuel filter, said supporting element having a cup-shaped receptacle for receiving said fuel filter, said fuel delivery unit having a first pump stage with an inflow opening which opens in said supply tank and a pressure-side opening which opens in said cup-shaped receptacle, and a second pump stage which sucks fuel from said cup-shaped receptacle, said aggregate having a delivery opening through which fuel is supplied from said second pump stage to the internal combustion engine.

25. An arrangement as defined in claim 24, wherein said components of said aggregate include a filter, said aggregate having a raiser conduit provided between said delivery opening of said first pump stage and an opening in said cup-shaped receptacle, said raiser conduit being open in an upper region of said filter in said cup-shaped receptacle.

26. An arrangement for supplying fuel to an internal combustion engine of a motor vehicle, comprising a supply tank; and an aggregate which is located in said supply tank and has a fuel delivery unit for supplying fuel from said supply tank to the internal combustion engine, said aggregate having a plurality of components extending along a delivery path of the fuel, said aggregate which is located in said supply tank being provided with a supporting element which carries holding means for said components of said aggregate, said supporting element having a projection, said components of said aggregate including a tubular fuel filter having two ends provided with rigid supporting rings, said supporting rings having inner diameters provided with elastic damping rings for supporting said fuel delivery unit, at least one of said damping rings being fixed on said projection of said supporting element.

27. An arrangement as defined in claim 26, wherein each of said damping rings is fixedly connected with a respective one of said supporting rings.

28. An arrangement for supplying fuel to an internal combustion engine of a motor vehicle, comprising a supply tank; and an aggregate which is located in said supply tank and has a fuel delivery unit for supplying fuel from said supply tank to the internal combustion engine, said aggregate having a plurality of components extending along a delivery path of the fuel, said aggregate which is located in said supply tank being provided with a supporting element which carries holding means for said components of said aggregate, said components of said aggregate including a fuel filter, said supporting element having a cup-shaped receptacle for receiving said fuel filter, said aggregate having a return conduit with an opening at the side of said cup-shaped receptacle, and a supply opening in said cup-shaped receptacle, said return opening conduit at said opening and said supply opening of said cup-shaped receptacle forming a jet pump with an opening provided in said cup-shaped receptacle and located near a cup bottom.

29. An arrangement as defined in claim 28, wherein said aggregate has a raiser conduit which is connected with said jet pipe and opens in said cup-shaped receptacle.

30. An arrangement as defined in claim 29, wherein said aggregate has a check valve arranged on said cup bottom and opening when a fuel level in said supply tank is higher than a fuel level in said cup-shaped receptacle and closing when the fuel level in said cup-shaped receptacle is higher than the fuel level in said fuel supply tank.

31. An arrangement for supplying fuel to an internal combustion engine of a motor vehicle, comprising a supply tank; and an aggregate which is located in said supply tank and has a fuel delivery unit for supplying fuel from said supply tank to the internal combustion engine, said aggregate having a plurality of components extending along a delivery path of the fuel, said aggregate which is located in said supply tank being provided with a supporting element which carries holding means for said components of said aggregate, said components of said aggregate including a fuel filter, said supporting element having a cup-shaped receptacle for receiving said fuel filter, said cup-shaped receptacle having a bottom with a central depression, said components of said aggregate including a filter which has a base plate with a cross-section corresponding to a cross-section of said bottom and centered in said cup-shaped receptacle.

* * * * *